(12) United States Patent
Tran et al.

(10) Patent No.: US 10,599,625 B2
(45) Date of Patent: Mar. 24, 2020

(54) MANAGING STORAGE OF DATA

(71) Applicant: Hewlett Packard Enterprise Development LP, Houston, TX (US)

(72) Inventors: Hoa Binh Nga Tran, Cambridge, MA (US); Charles Edward Bear, Cambridge, MA (US); Jaimin Mukesh Dave, Cambridge, MA (US); Vivek Bharathan, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 299 days.

(21) Appl. No.: 15/308,654

(22) PCT Filed: Jun. 9, 2014

(86) PCT No.: PCT/US2014/041572
§ 371 (c)(1),
(2) Date: Nov. 3, 2016

(87) PCT Pub. No.: WO2015/191030
PCT Pub. Date: Dec. 17, 2015

(65) Prior Publication Data
US 2017/0139959 A1    May 18, 2017

(51) Int. Cl.
*G06F 16/22*     (2019.01)
*G06F 16/2453*   (2019.01)
*G06F 16/23*     (2019.01)

(52) U.S. Cl.
CPC ........ *G06F 16/221* (2019.01); *G06F 16/2393* (2019.01); *G06F 16/2453* (2019.01)

(58) Field of Classification Search
CPC ......... G06F 17/30383; G06F 17/30315; G06F 17/30457
See application file for complete search history.

(56) References Cited

U.S. PATENT DOCUMENTS

| | | | |
|---|---|---|---|
| 5,687,362 A | | 11/1997 | Bhargava et al. |
| 6,339,769 B1 | * | 1/2002 | Cochrane .......... G06F 17/30457 |
| 6,748,393 B1 | | 6/2004 | Kapoor et al. |
| 7,912,833 B2 | | 3/2011 | Gui et al. |
| 8,478,733 B2 | | 7/2013 | Dantale |
| 2002/0059191 A1 | | 5/2002 | Tamura |

(Continued)

OTHER PUBLICATIONS

International Searching Authority, "Notification of Transmittal of the International Search Report and the Written Opinion", PCT/US2014/041572, dated Feb. 24, 2015, 10 pages.

(Continued)

*Primary Examiner* — Grace Park
*Assistant Examiner* — J Mitchell Curran

(57) ABSTRACT

According to an example, in a method for managing storage of data from an input table, a projection definition that includes an expression to be executed on data contained in a column of the input table may be accessed. The expression on the data contained in the column of the input table may be executed to obtain results data, which may be stored in an expression projection, in which the expression projection includes a column that provides physical storage for the results data. The results data may be stored in the expression projection, segmented, and encoded. In addition, the expression projection may be stored in a node.

18 Claims, 9 Drawing Sheets

(56) References Cited

U.S. PATENT DOCUMENTS

| | | |
|---|---|---|
| 2005/0050054 A1 | 3/2005 | Clark et al. |
| 2006/0122964 A1* | 6/2006 | Yu .................. G06F 17/30383 |
| 2008/0319957 A1 | 12/2008 | Muralidhar et al. |
| 2009/0158251 A1* | 6/2009 | Angrish ................ G06F 16/84 |
| | | 717/115 |
| 2010/0030757 A1 | 2/2010 | Chordia et al. |
| 2011/0016157 A1* | 1/2011 | Bear ................ G06F 17/30312 |
| | | 707/804 |
| 2011/0213766 A1 | 9/2011 | Hong et al. |
| 2012/0005190 A1 | 1/2012 | Faerber et al. |

OTHER PUBLICATIONS

Larson, P-A. et al., "View Matching for Outer-Join Views", Microsoft Research (Research Paper), Sep. 1, 2005, 12 pages.

\* cited by examiner

MANAGING STORAGE OF DATA

BACKGROUND

Databases are computerized data storage and retrieval systems that are organized in any of a number of different manners. A typical manner in which databases are organized is through the storage of data in multiple tables composed of columns and rows. The columns typically identify a category or topic and the rows typically include data pertaining to a particular entity or feature. As an example, the category of a column may be "clients" and each of the rows may identify a particular client. Oftentimes, the tables in databases, such as those stored as structured data, contain very large numbers of columns.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
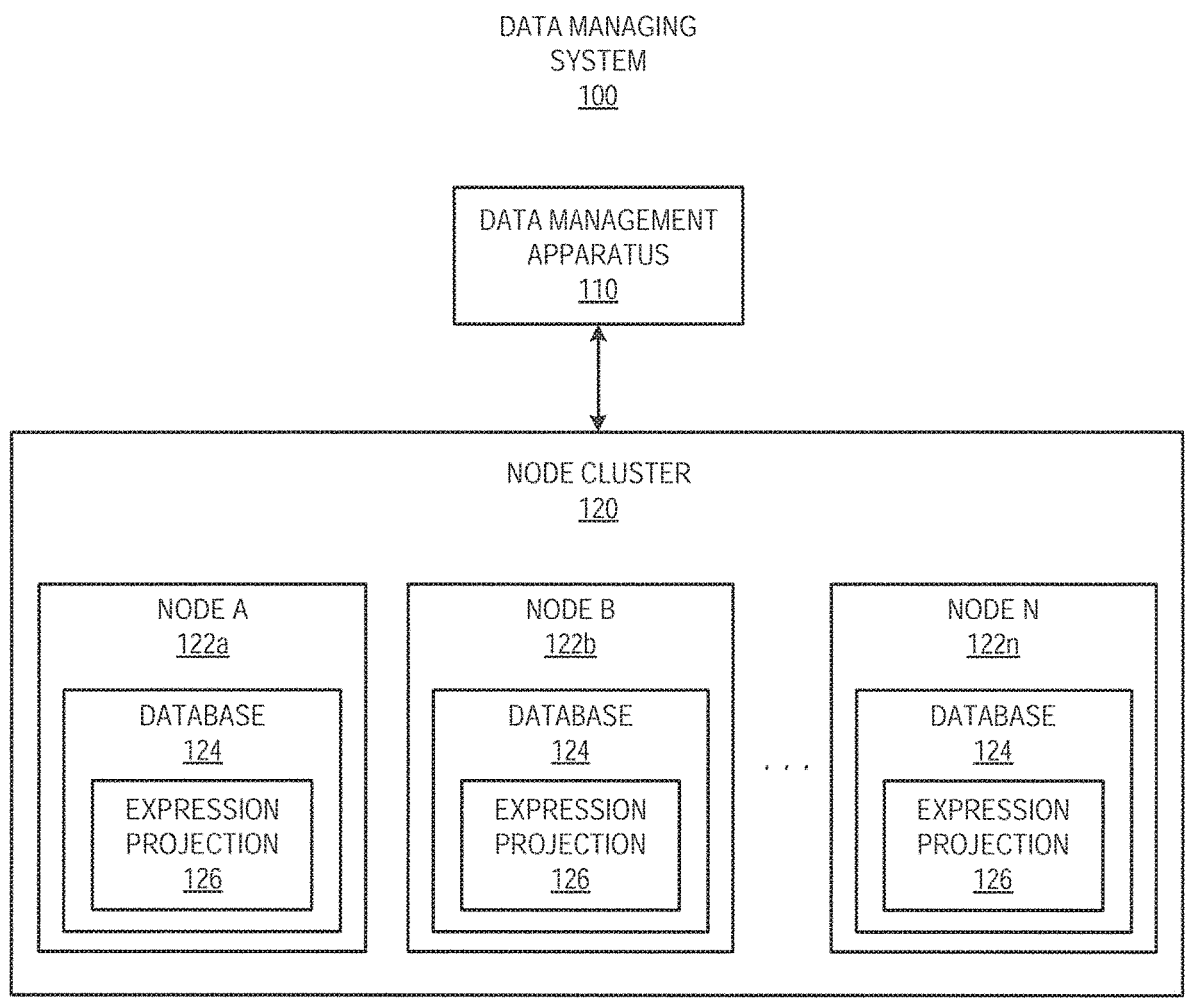
FIG. 1A shows a simplified schematic diagram of a data managing system, which may implement various aspects of the methods disclosed herein, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

As used throughout the present disclosure, the term "includes" means includes but not limited to, the term "including" means including but not limited to. The term "based on" means based at least in part on. In addition, the terms "a" and "an" are intended to denote at least one of a particular element.

The tables in databases, such as those stored as structured data, often contain very large numbers of columns. As such, performance of queries on the data contained in such tables typically takes a relatively long amount of time. Secondary tuning structures, such as indexes and materialized views for the tables are often created for improved query performance. However, these tuning structures are often expensive to maintain during data load, which leads to rebuilding of these tuning structures during nightly batch windows, and thus prevents the ability to do real-time analytics.

In other instances, the data is stored in physical storage (e.g., disks) in formats that optimize query execution, such as in projections. Projections may be defined as collections of table columns that are optimized for query performance (or analytics performance) at the physical storage level. A projection may include some or all of the columns of one or more tables. In addition, a projection that includes all of the columns of a table may be termed a super projection and a projection that joins one or more tables may be called a pre-join projection.

Projections may store data sets on the physical storage rather than compute them each time the projections are used in a query. Moreover, projections may not be aggregated, but rather may store every row in a table in full atomic detail and the data may automatically be refreshed whenever data values are inserted, appended, or changed. Database management systems that employ projections are available from HP Vertica™, which is headquartered in Cambridge, Mass.

The following discussion provides an example of a manner in which a projection may be created. It should be clearly understood that the following discussion is for purposes of illustration and should thus not be construed as limiting the present disclosure. In this discussion, the creation of a projection for two tables, tab1 and tab2, that have columns of different data types, and in which the relationship between tab1 and tab2 is one to many (1–n), is taken as an example. In this example, tab1 has the following columns: id, f, i, c, and v. In addition, tab2 has the following columns: fk, f1, f2, i1, i2, c1, c2, v1, v2, d1, d2, t1, t2, m1, and m2. The variables used to denote the columns may represent the types of data contained in those columns. For instance, "i" may indicate integers, "f" may represent float, "c" may represent char, "v" may represent varchar, "d" may represent date, "t" may represent timestamp, and "m" may represent money value. The tables tab1 and tab2 are discussed throughout the present disclosure for purposes of illustration.

Initially, a 1–n relationship may be defined between tab1 and tab2 by adding a "foreign key" to tab2 that references tab1. This relationship may be written as:

Example (1): ALTER TABLE tab2 ADD CONSTRAINT fk_tab1 FOREIGN KEY (fk) REFERENCES tab1 (id).

A replicated super projection, sp1, for tab1 may be created, in which sp1 includes all of the columns of tab1. Sp1 may be sorted, for instance, on column id. The projection sp1 may be created, for instance, through the following example:

Example (2): CREATE PROJECTION sp_1 AS SELECT i, c, v, f, id FROM tab1 ORDER by id UNSEGMENTED ALL NODES.

A segmented super projection, sp2, for tab2 may be created, in which sp2 includes all of the columns of tab2. Sp2 may, for instance, be sorted on columns i1 and i2, run-length encoding (RLE) encoded on columns i1 and i2, segmented on columns c2, c1, t1, and t2, and may still be working if one node (e.g., hard drive) is down. Sp2 may be segmented based on a hash function that provides substantially even distribution of data across some or all of the nodes in a cluster for enhanced, e.g., optimal, query execution. In other words, sp2 may be segmented according to a desired manner as to which nodes store particular rows of data. However, in Example (2), sp2 may be unsegmented, i.e., all of the data may be stored in a single node, on all of the nodes, etc. In addition, sp2 may be stored on multiple nodes to provide redundancy in case of a node failure. Sp2 may be created, for example, through the following example:

Example (3): CREATE PROJECTION sp2 (i1 ENCODING
RLE, i2 ENCODING RLE, c1, c2, f1, f2, id, v1, v2, d1,
d2, t1, t2, m1, m2)
AS SELECT i1, i2, c1, c2, f1, f2, fk, v1, v2, d1, d2, t1, t2,
m1, m2
FROM tab2
ORDER BY i1, i2
SEGMENTED BY hash(c2, c1, t1, t2) ALL NODES
KSAFE 1.

In addition, a segmented pre-join projection, prej, that includes columns from both tab1 and tab2 may be created. Prej may, for instance, be sorted on columns i, i1, and i2, RLE encoded on columns i, i1, and i2, segmented on columns c, c1, and c2, and still working if one node is down. Prej may be segmented based on a hash function that provides substantially even distribution of data across some or all of the nodes in a cluster for enhanced, e.g., optimal, query execution. In addition, prej may be stored on multiple nodes to provide redundancy in case of a node failure. Prej may be created, for example, through the following example:

Example (4): CREATE PROJECTION prej (i ENCODING
RLE, i1 ENCODING RLE, i2 ENCODING RLE, c, c1,
c2, f1, f2)
AS SELECT i, i1, i2, c, c1, c2, f1, f2
FROM tab1, tab2
WHERE tab1.id=tab2.fk
ORDER BY i, i1, i2
SEGMENTED BY hash(c, c1, c2) All Nodes Ksafe 1.

As noted from the example discussed above, projections may contain raw data from the input tables. According to an example, and as discussed in greater detail herein, expressions, such as logical functions, mathematical functions, etc., may be executed on the data contained in the input tables and the results of the executed expressions may be stored in an expression projection, which is equivalently referred to herein as a "function projection." Generally speaking, the expression projection may be similar to the projection discussed above, but instead of storing data that is identical to the data contained in the input tables, the expression projection may store data that is derived, e.g., computed, applied, etc., from the data contained in the input tables. By way of example in which a column of an input table includes timestamps (which include times and dates), an expression that extracts the dates from the timestamps may be executed on that column, such that the results of the executed expression are the dates from the timestamps. In this example, the dates from the timestamps may be stored in an expression projection. In addition, the dates may be sorted, encoded, and segmented in the expression projection similarly to the data in a projection, to thus enable performance of queries on the dates to be enhanced, e.g., queries on the dates may be performed in an optimized manner (for instance, in a least amount of time). Without the expression projection, for instance, the timestamps contained in the input table may not be easily sorted by date due to the additional information contained in the timestamps data.

Disclosed herein are methods for managing storage of data from an input table, in which an expression projection is managed. Also disclosed herein are apparatuses and computer readable storage media that may implement the disclosed methods. Through implementation of the methods, apparatuses, and computer readable storage media disclosed herein, an expression projection that contains data derived from the data contained in at least one input table may automatically be generated such that the derived data may also be stored, sorted, segmented, and encoded for enhanced query performance. In addition, the expression projection may be updated as new data is inserted or copied into the at least one input table. In one regard, through the management of data storage using an expression projection as disclosed herein, the amount of time required to perform a query for data derived from the data contained in the at least one input table may significantly be reduced and in some cases, minimized.

With reference first to FIG. 1A, there is shown a simplified schematic diagram of a data managing system 100, which may implement various aspects of the methods disclosed herein, according to an example. It should be understood that the data managing system 100 depicted in FIG. 1A may include additional elements and that some of the elements depicted therein may be removed and/or modified without departing from a scope of the data managing system 100 disclosed herein.

The data managing system 100 is depicted in FIG. 1A as including a data management apparatus 110 and a node cluster 120. The node cluster 120 may include multiple nodes 122a-122n, in which "n" may represent a value that is larger than 1. Each of the nodes 122a-122n may be a hard disk drive or other physical storage device on which data may be stored, for instance, as databases 124. The databases 124 are also depicted as each including an expression projection 126. As discussed in greater detail below, the data management apparatus 110 may manage the expression projections 126. The data management apparatus 110 may manage the expression projections 126 by creating the expression projections 126, copying data into the expression projections 126, updating data contained in the expression projections 126, deleting data contained in the expression projections 126, merging data among multiple expression projections 126, etc.

Figure 1B:
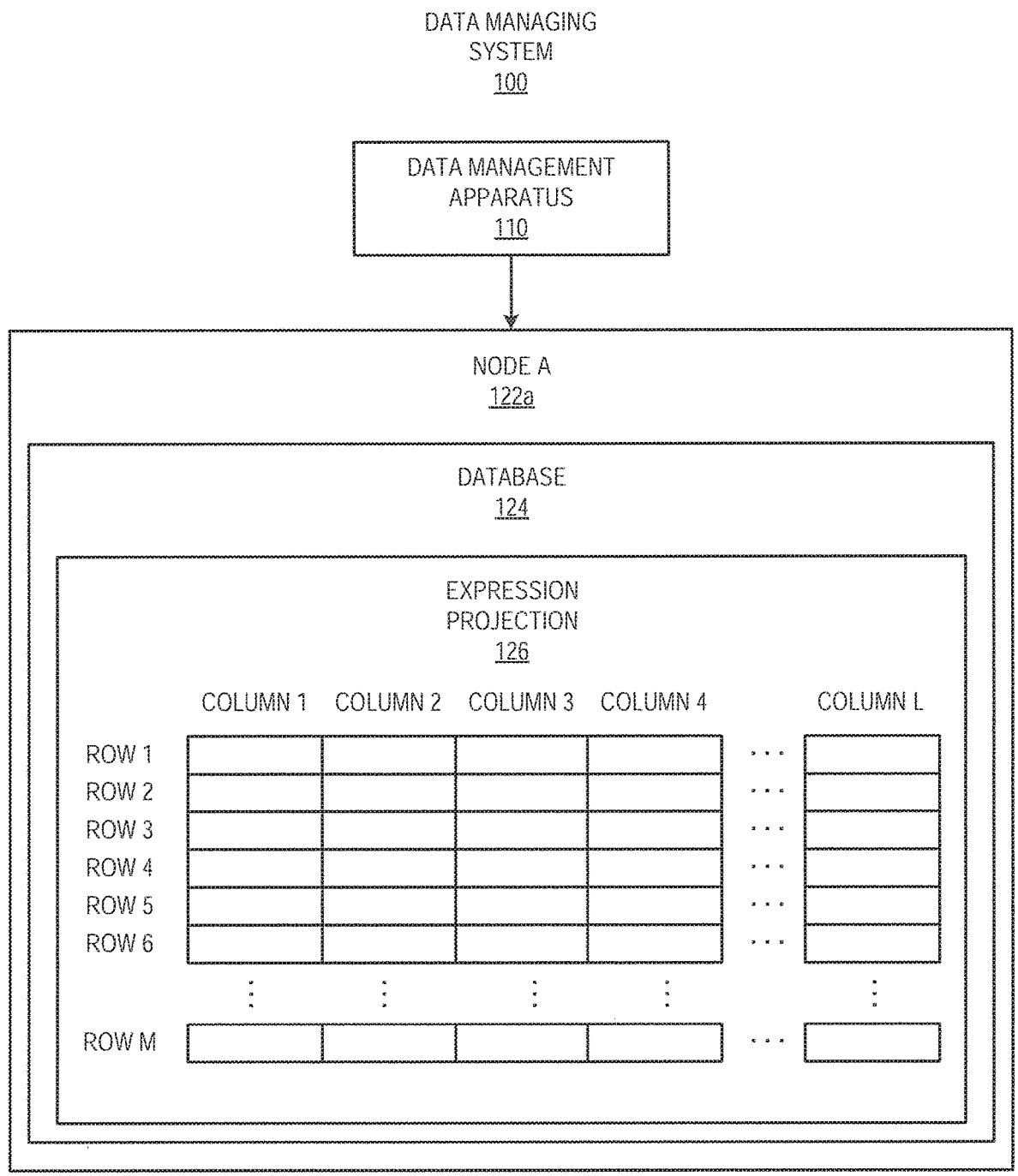
FIG. 1B shows a more detailed schematic diagram of the data managing system depicted in FIG. 1A, according to an example of the present disclosure.

In addition to the expression projections 126, although not shown, the data contained in the databases 124 may additionally be stored in other arrangements, for instance, as projections, input tables, etc. The data management apparatus 110 may therefore also manage the other arrangements of the data in manners that optimize query performance. In addition, although a single node cluster 120 is depicted in FIG. 1A, it should be understood that the data managing system 100 may include any number of node clusters 120, in which the nodes 122a-122n may be in one node cluster 120 or in multiple node clusters 120. Likewise, the nodes 122a-122n may each include any number of databases 124 and the databases 124 may each include any number of expression projections 126. Moreover, the data contained in a particular expression projection 126 may be stored in a single node 122a or across multiple nodes 122a-122n, for instance, depending upon which storage arrangement of the expression projection 126 may maximize query performance. Furthermore, a particular expression projection 126 may be stored on multiple nodes 122a-122n Turning now to FIG. 1B, there is shown a more detailed schematic diagram of the data managing system 100 depicted in FIG. 1A, according to an example. Particularly, FIG. 1B depicts an expression projection 126 stored in node 122a as being a table composed of a plurality of columns 1–L and a plurality of rows 1–M, in which "L" and "M" may represent values larger than 1 and may differ from each other. The expression projection 126 may be a structured data table and may be stored in the database 124 in any suitable manner. In addition, the expression projection 126 may include various types of data, such as numerical, categorical, character strings, Boolean, etc. According to an example, data may be generalized to any data that contains elements (equivalent to rows) and fields (equivalent to columns) and may be transformed to have the form of the expression projection 126. In this example, for instance, data received in a format other than in a table format, such as an XML file, may be transformed into the form of the expression projection 126.

In addition to managing the creation, updating, etc., of the expression projection 126, the data management apparatus 110 may also manage the expression projection 126 to perform queries on the expression projection 126. That is, for instance, the data management apparatus 110 may receive query requests from a client device (not shown) and may execute the query requests on the data contained in the expression projection 126. The data management apparatus 110 may also output results from the query execution to the client device. In other examples, the data management apparatus 110 may also execute the query requests on other projections (not shown), for instance, projections that do not contain expressions.

Figure 2:
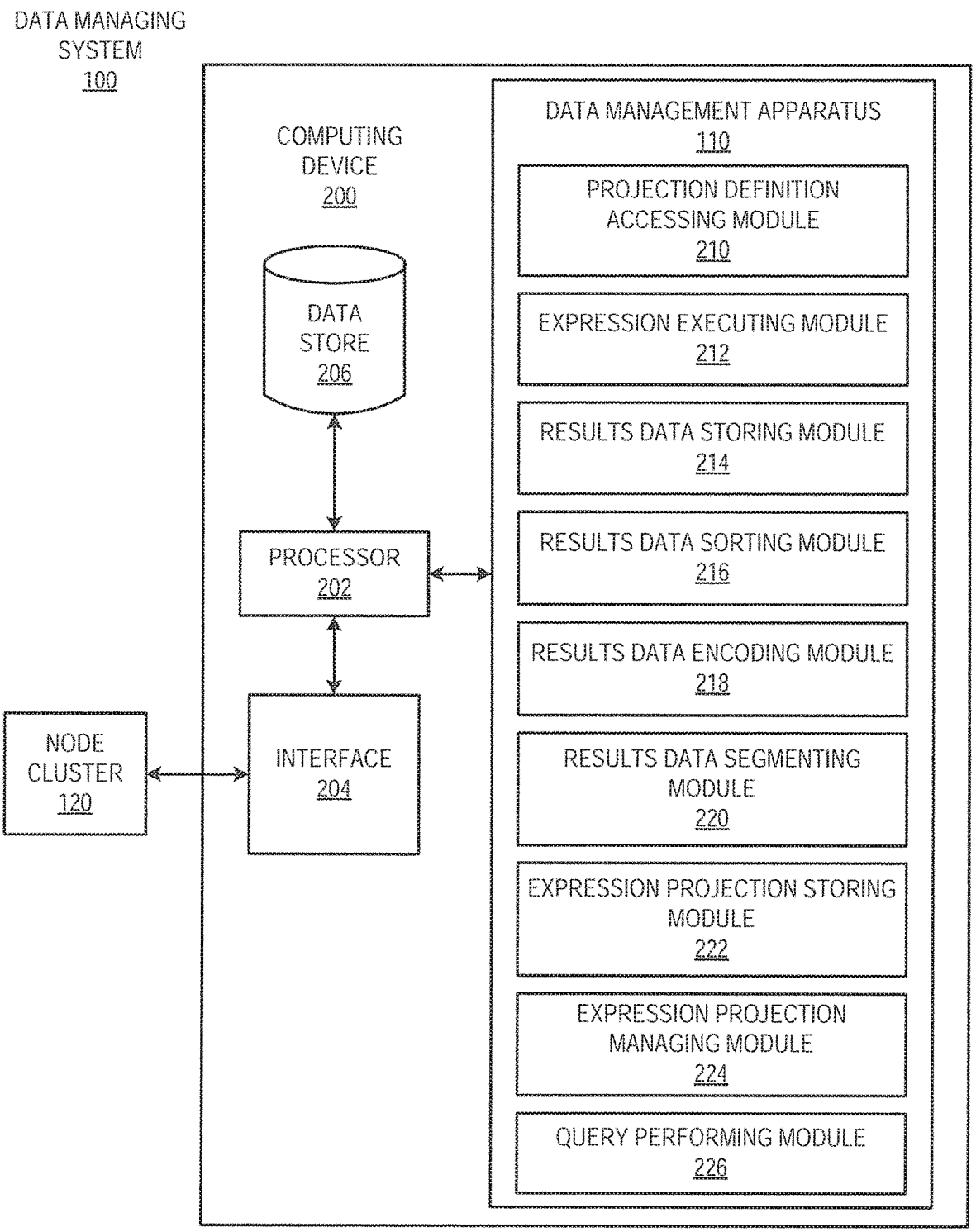
FIG. 2 shows a simplified block diagram of the data managing system depicted in FIGS. 1A and 1B, according to an example of the present disclosure.

Turning now to FIG. 2, there is shown a simplified block diagram of the data managing system 100 depicted in FIGS. 1A and 1B, according to an example. It should be understood that the data managing system 100 depicted in FIG. 2 may include additional elements and that some of the elements depicted therein may be removed and/or modified without departing from a scope of the data managing system 100.

The data managing system 100 is depicted in FIG. 2 as including a computing device 200. The computing device 200 is depicted as including, in addition to the data management apparatus 110, a processor 202, an interface 204, and a data store 206. The data management apparatus 110 is also depicted as including a projection definition accessing module 210, an expression executing module 212, a results data storing module 214, a results data sorting module 216, a results data encoding module 218, a results data segmenting module 220, an expression projection storing module 222, an expression projection managing module 224, and a query performing module 226.

The processor 202, which may be a microprocessor, a micro-controller, an application specific integrated circuit (ASIC), or the like, may perform various processing functions in the computing device 200. The processing functions may include invoking or implementing the data management apparatus 110 and particularly, the modules 210-226 of the data management apparatus 110, as discussed in greater detail herein below. According to an example, the data management apparatus 110 is a hardware device on which is stored various sets of machine readable instructions. The data management apparatus 110 may be, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored. In this example, the modules 210-226 may be software modules, e.g., sets of machine readable instructions, stored in the data management apparatus 110.

In another example, the data management apparatus 110 may be a hardware component, such as a chip, an integrated circuit, etc., and the modules 210-226 may be hardware modules on the hardware component. In a further example, the modules 210-226 may include a combination of software and hardware modules. In a yet further example, the processor 202 may be an ASIC that is to perform the functions of the modules 210-226. In this example, the processor 202 and the table processing apparatus 120 may be a single processing apparatus.

The processor 202 may store data in the data store 206 and may use the data in implementing the modules 210-226. For instance, the processor 202 may store data of an input table from which an expression projection 126 is to be created. As another example, the processor 202 may store a projection definition received from a client device in the data store 206. In any regard, the data store 206 may be volatile and/or non-volatile memory, such as DRAM, EEPROM, MRAM, phase change RAM (PCRAM), memristor, flash memory, and the like. In addition, or alternatively, the data store 206 may be a device that may read from and write to a removable media, such as, a floppy disk, a CD-ROM, a DVD-ROM, or other optical or magnetic media.

The interface 204 may include hardware and/or software to enable the processor 202 to communicate with the nodes 122a-122n in a node cluster 120. The interface 204 may enable a wired and/or wireless connection to the nodes 122a-122n over a network, such as an intranet, a local area network, the Internet, etc. In other examples, the computing device 200 may be directly connected to the nodes 122a-122n, e.g., the computing device 200 may be a server that is to manage the databases 124 stored in the nodes 122a-122n. The interface 204 may include a network interface card and/or may also include hardware and/or software to enable the processor 202 to communicate with various input and/or output devices, such as a keyboard, a mouse, a display, another computing device, etc., through which a user may input instructions into the computing device 200.

Various manners in which the processor 202 in general, and the modules 210-226 in particular, may be implemented are discussed in greater detail with respect to the methods 300, 400, 500, 520, and 540 respectively depicted in FIGS. 3, 4, and 5A-5C. Particularly, FIGS. 3, 4, and 5A-5C depict flow diagrams of various methods 300, 400, 500, 520, and 540 for managing storage of data from an input table, according to a plurality of examples. It should be apparent to those of ordinary skill in the art that the methods 300, 400, 500, 520, and 540 may represent generalized illustrations and that other operations may be added or existing operations may be removed, modified, or rearranged without departing from the scopes of the methods 300, 400, 500, 520, and 540. Generally speaking, the processor 202 depicted in FIG. 2 may implement the methods 300, 400, 500, 520, and 540 through implementation of at least some of the modules 210-226.

Figure 3:
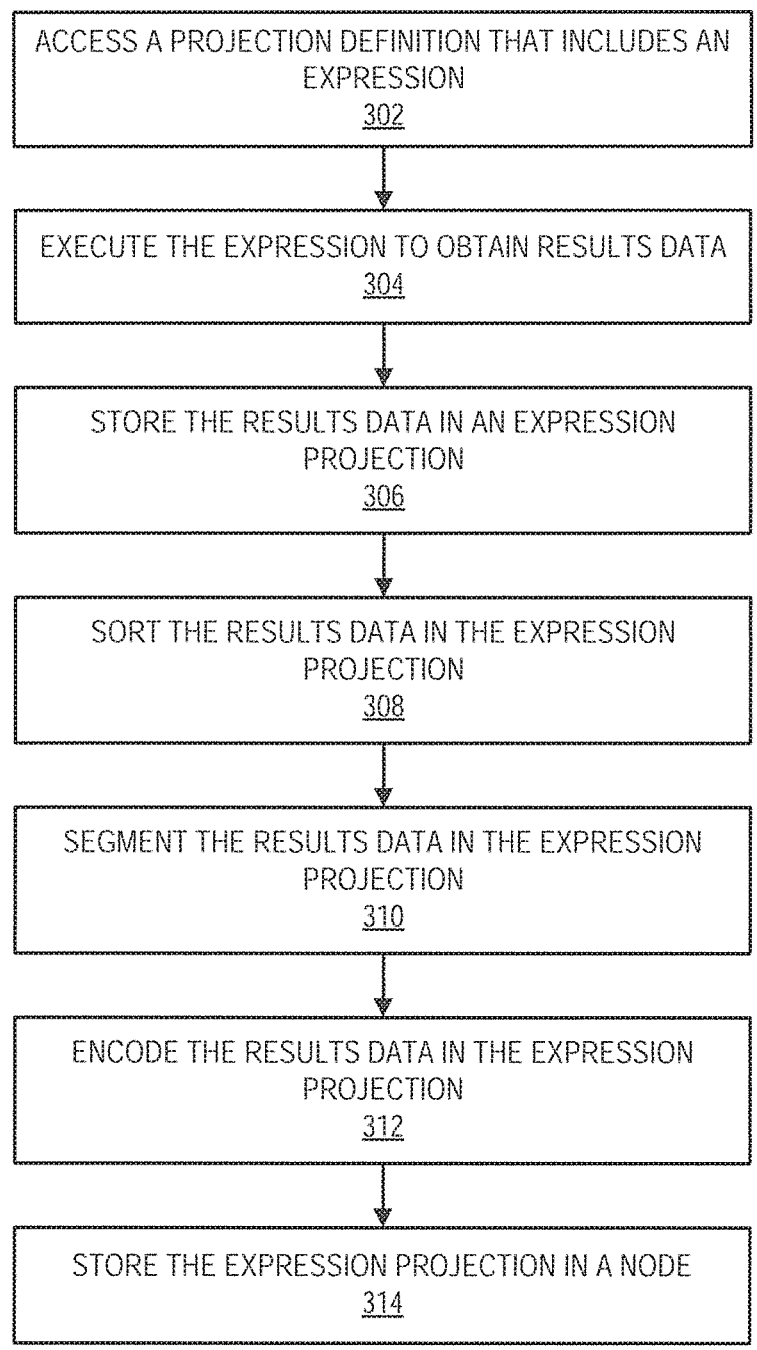
FIGS. 3, 4, and 5A-5C, respectively, show flow diagrams of methods for managing storage of data from an input table, according to examples of the present disclosure.

With reference first to the method 300 depicted in FIG. 3, at block 302, a projection definition that includes an expression to be executed on data contained in a column (or columns) of an input table may be accessed. In addition, a projection definition may identify which column or columns of the input table the expression is to be executed. A projection definition may further identify other functions that are to be performed on the results of the expression execution. For instance, the projection definition may include instructions as to how the results are to be sorted, segmented, stored, etc. According to an example, a user may generate a projection definition and may communicate the generated projection definition to the processor 202 and the processor 202 may store the generated projection definition in the data store 206. In any regard, the projection definition accessing module 210 may access the projection definition either directly from a client device, the data store 206, or other source. Moreover, the projection definition may include an expression that is to be executed on data contained columns of multiple input tables. In this regard, the expression contained in the projection definition may be executed to join multiple input tables.

Various examples of projection definitions are provided below. Definitions of at least some of the terms recited in the following examples may be found in the examples discussed above. In addition, the following examples show that the projection definition may include multiple expressions executed on multiple sets of columns, which may result in expression projections having multiple columns.

Example (5): CREATE EXPRESSION PROJECTION ep1 AS SELECT i+f As fi FROM tab1 SEGMENTED BY HASH(i*f) ALL NODES;

The projection definition in Example (5) includes instructions to create an expression projection, ep1, that includes the execution of an expression (in this example, the expression is the addition function of columns i and f) of the data contained in the respective rows of column i and column f from tab1 and to store the results of the expression execution in an expression projection that includes column fi. This projection definition also includes instructions to segment the data in column fi by a hash of columns i and f and to store copies of the column fi in all of the nodes 122a-122n of a node cluster 120 as indicated by the result of the hash function.

Example (6): CREATE PROJECTION ep2 AS SELECT c, i*f AS fi FROM tab1 SEGMENTED BY HASH(i*f) ALL NODES;

The projection definition in Example (6) includes instructions to create an expression projection, ep2, that includes the execution of an expression (in this example, the expression is to include column c and a multiplication of column i and column f) of the data contained in the respective rows of columns c, i, and f from tab1 and to store the results of the expression execution in an expression projection that includes column fi. This projection definition also includes instructions to segment the data in column fi by a hash of columns i and f and to store copies of the column fi in all of the nodes 122a-122n of a node cluster 120 as indicated by the result of the hash function.

Example (7): CREATE PROJECTION ep3 AS SELECT i1+i2 AS iplus FROM tab2 order by i1+i2;

The projection definition in Example (7) includes instructions to create an expression projection, ep3, that includes the execution of an expression (in this example, the expression is the addition function) of the data contained in the respective rows of columns i1 and i2 from tab2 and to store the results of the expression execution in an expression projection that includes column iplus. This projection definition also includes instructions to order the data in column iplus by the sum of columns i1 and i2.

Example (8): CREATE PROJECTION ep4 AS
  SELECT i1, f1*f2 AS f_mult, EXTRACT (YEAR FROM d1) AS d1_year,
  CHAR_LENGTH(v1)+CHAR_LENGTH(v2) AS v_length,
  t1-t2 AS t_minus, m1/m2 AS m_ratio,
  SIN(f1+f2) AS f_sin
  FROM tab2
  SEGMENTED BY HASH(i1) ALL NODES KSAFE 1;

The projection definition in Example (8) includes instructions to create an expression projection, ep4, that includes the execution of multiple expressions on multiple sets of columns contained in tab2. This projection definition also includes instructions to store the results of the expression executions in an expression projection that includes the columns f_mult, d1_year, v_length, t_minus, m_ratio, and f_sin. This projection definition further includes instructions to segment the data in ep4 by a hash of column i1 and to store a copy of ep4 in at least two nodes, as indicated by the result of the hash function, to ensure that ep4 will still be accessible if one of the nodes fails.

Example (9): CREATE PROJECTION ep5 AS
  SELECT i1, f1*f2 AS f_mult, EXTRACT (YEAR FROM d1) AS d1_year,
  CHAR_LENGTH(v1)+CHAR_LENGTH(v2) AS v_length,
  t1-t2 AS t_minus, m1/m2 AS m_ratio,
  SIN(f1+f2) AS f_sin
  FROM tab2
  SEGMENTED BY HASH(f1*f2, SIN(f1+f2)) ALL NODES KSAFE 1;

The projection definition in Example (9) includes instructions to create an expression projection, ep5, that includes the execution of multiple expressions on multiple sets of columns contained in tab2. This projection definition also includes instructions to store the results of the expression executions in an expression projection that includes the columns f_mult, d1_year, v_length, t_minus, m_ratio, and f_sin. This projection definition further includes instructions to segment the data in the ep4 by a hash that includes a function of columns f1*f2 and sin(f1+f2) and to store a copy of ep5 in at least two nodes, as indicated by the result of the hash function, to ensure that ep4 will still be accessible if one of the nodes fails.

Example (10): CREATE PROJECTION eprej AS
  SELECT i+i1+i2 AS i_total, c, c1, c2, f1*f2 AS f_mult
  FROM tab1, tab2
  WHERE tab1.id=tab2.fk
  ORDER BY i+i1+i2
  SEGMENTED BY HASH(c, c1, c2) ALL NODES KSAFE 1;

The projection definition in Example (10) includes instructions to create a pre-join expression projection, eprej, that includes the execution of multiple expressions on multiple sets of columns contained in tab1 and tab2. This projection definition also includes instructions to store the results of the expression executions in an expression projection that includes the columns i_total and f_mult. This projection definition further includes instructions to order the data by the columns i+i1+i2, segment the data in the eprej by a hash that includes a function of columns c, c1, and c2, and to store a copy of eprej in at least two nodes, as indicated by the result of the hash function, to ensure that eprej will still be accessible if one of the nodes fails.

At block 304, the expression in the projection definition may be executed on the data contained in the column of the input table identified at block 302 to obtain results data. For instance, the processor 202 may implement the expression executing module 212 to execute the expression in the projection definition on the column or columns identified in the projection definition. This may include the execution of multiple expressions on a column or on multiple columns in instances in which the projection definition includes multiple expressions to be executed on the column or columns.

At block 306, the results data may be stored in an expression projection. For instance, the results data storing module 214 may store the results data in the expression projection identified in the projection definition. As discussed herein, the expression projection may include at least one column that provides physical storage for the results data. According to an example, the syntax for creating expression projections may be the same as the syntax from creating normal projections. However, a column of an expression projection may be an expression of one or many table columns.

For normal projections, i.e., projections other than expression projections, to keep track of which column in the projection represents which table column, there are two data structures/maps in the projection that map table columns to the indexes of the columns in the projection and vice versa. Each table column is presented by a pair, e.g., TabColPair, of its table's object id (oid) and the position of the column in the table. Thus, for instance, in tab1, because column id is defined first, the index for column id in tab1 is 1. Hence, the TabColPair of column id is <tab1_oid, 1>. Similarly, <tab1_oid, 2>, <tab1_oid, 3>, <tab1_oid, 4>, <tab1_oid, 5> are the TabColPairs of columns f, i, c, and v respectively, which is summarized in Table 1 below.

TABLE 1

| Table Column/Attribute | TabColPair |
| --- | --- |
| id | <tab1_oid, 1> |
| f | <tab1_oid, 2> |
| i | <tab1_oid, 3> |
| c | <tab1_oid, 4> |
| v | <tab1_oid, 5> |

For normal projections, there are two maps that map a TabColPair with its projection column index and vice versa. The two maps for super projection, sp1, of tab1, which is discussed above, may be:
Map 1: Mapping TabColPairs to indexes of the projection columns
  <tab1_oid, 3>-->1
  <tab1_oid, 4>-->2
  <tab1_oid, 5>-->3
  <tab1_oid, 2>-->4
  <tab1_oid, 1>-->5
Map 2: Mapping indexes of the projection columns to its TabColPairs
  1--><tab1_oid, 3>
  2--><tab1_oid, 4>
  3--><tab1_oid, 5>
  4--><tab1_oid, 2>
  5--><tab1_oid, 1>
For expression projections, a variable, inputExprs, may be added to the two maps above to map a TabColPair of an expression projection with its projection column index and vice versa. The inputExprs may keep the expressions of the mapped indexes and may be a vector (array) of expressions of variables that apply to an index of the two maps. However, the indexes may not represent the positions of the columns of the expression projections. Instead, the indexes may simply identify different table columns used in the expression projections. For instance, for the expression projection, ep2, which is discussed above, its two maps and inputExprs may be:
Map 1: Mapping TabColPairs to indexes/numbers 1, 2, 3, . . .
  <tab1_oid, 4>-->1: represent table column, c
  <tab1_oid, 3>-->2: represent table column, i
  <tab1_oid, 2>-->3: represent table column, f
Map 2: Mapping indexes/numbers from Map 1 Back to the TabColPairs
  1--><tab1_oid, 4>
  2--><tab1_oid, 3>
  3--><tab1_oid, 2>
inputExprs: an vector (array) of expressions of variables (var[1]) that apply to index/number of the two maps above.

The expression of the vector/array of item var[1] may mean the index/number 1 in Map1 and Map2. In addition, the expression of the vector/array of item var[2]+var[3] may mean the indexes/numbers 2 and 3 in Map1 and Map2. In the example above, the first item of the inputExprs is "var[1]," and Map2 may be used to retrieve the TabColPair of index/number "1" in var[1]. As such, var[1] is equivalent to <tab1_oid, 4>. In addition, the second item of the inputExprs is "var[2]+var[3]," and Map2 may be used to retrieve the TabColPairs of index/number "2" and "3". As such, "var[2]+var[3]" is equivalent to "<tab1_oid, 3>+<tab1_oid, 2>" or (i+f).

At block 308, the results data in the expression projection may be sorted. For instance, the results data sorting module 216 may sort the results data contained in the expression projection according to a sorting instruction contained in the projection definition accessed at block 302. In other examples, the results data may be sorted in other sort orders. In addition, the results data in a particular column of the expression projection may be sorted with respect to each other and/or the columns of the expression projection may be sorted with respect to each other. According to an example, the results data in the expression projection may be sorted to enhance, e.g. maximize, performance of queries on the results data. By way of example, the results data may be sorted to enable queries to be performed on the results data in a minimal amount of time.

At block 310, the results data in the expression projection may be segmented. For instance, the results data segmenting module 220 may segment the results data (or the entire expression projection) based on a hash function that provides substantially even distribution of the results data across some or all of the nodes 122a in the node cluster 120 for enhanced, e.g., optimal, query execution. The results data segmenting module 220 may segment the results data contained in the expression projection according to a segmenting instruction contained in the projection definition accessed at block 302. In other examples, the results data may be segmented in other segmenting arrangements, for instance, to enhance, e.g. maximize, performance of queries on the results data.

At block 312, the results data in the expression projection may be encoded. For instance, the results data encoding module 218 may perform run-length encoding on the results data to compress the results data. In other examples, the results data encoding module 216 may compress or encode the results data using other encoding techniques.

At block 314, the results data, i.e., the expression projection, may be stored in a node 122a. For instance, the expression projection storing module 222 may store the expression projection in the node 122a or across multiple nodes 122a-122n according to the segmentation of the expression projection determined at block 312. In addition, the expression projection storing module 222 may store multiple copies of the expression projection on multiple ones of the nodes 122a-122n to provide redundancy in case of a failure of one of the nodes 122a-122n. By way of example, the expression projection storing module 222 may store a number of copies of the expression projection equivalent to the number identified in the projection definition accessed at block 302.

Following the creation of the expression projection through implementation of the method 300, queries may be performed on the expression projection. For instance, a query may be received for results pertaining to data derived from data contained in an input table, in which the derived data is stored in the expression projection. The query performing module 226 may perform the received query on the expression projection without having to derive the data from the input table following receipt of the query. In one regard, therefore, the query on the expression projection may be performed in a relatively faster manner as compared with queries that are performed on data that is derived following receipt of the query.

According to an example, in addition the expression projection, a plurality of other projections, that either contain or do not contain expressions, may also be maintained. In this example, the expression projection and the other projections may be maintained in a manner that enables queries to be answered from at least one of the expression projection and the other projections in an optimized, e.g., least amount of time, manner. That is, the data contained in the expression projection and the other projections may be sorted, segmented, etc. in a manner that enables the optimized query performance. In addition, the answer to query may be consistent, e.g., identical, to answers resulting from a query of the input table from which the expression projection and the other projections are derived.

In addition to the creation of the expression projection, the data management apparatus 110 may perform other functions with respect to the expression projection. The other functions may include performance of, for instance, an Insert or Copy command, a Delete command, an Update data command, and a Merge command. Examples of these functions are depicted in the following diagrams.

Figure 4:
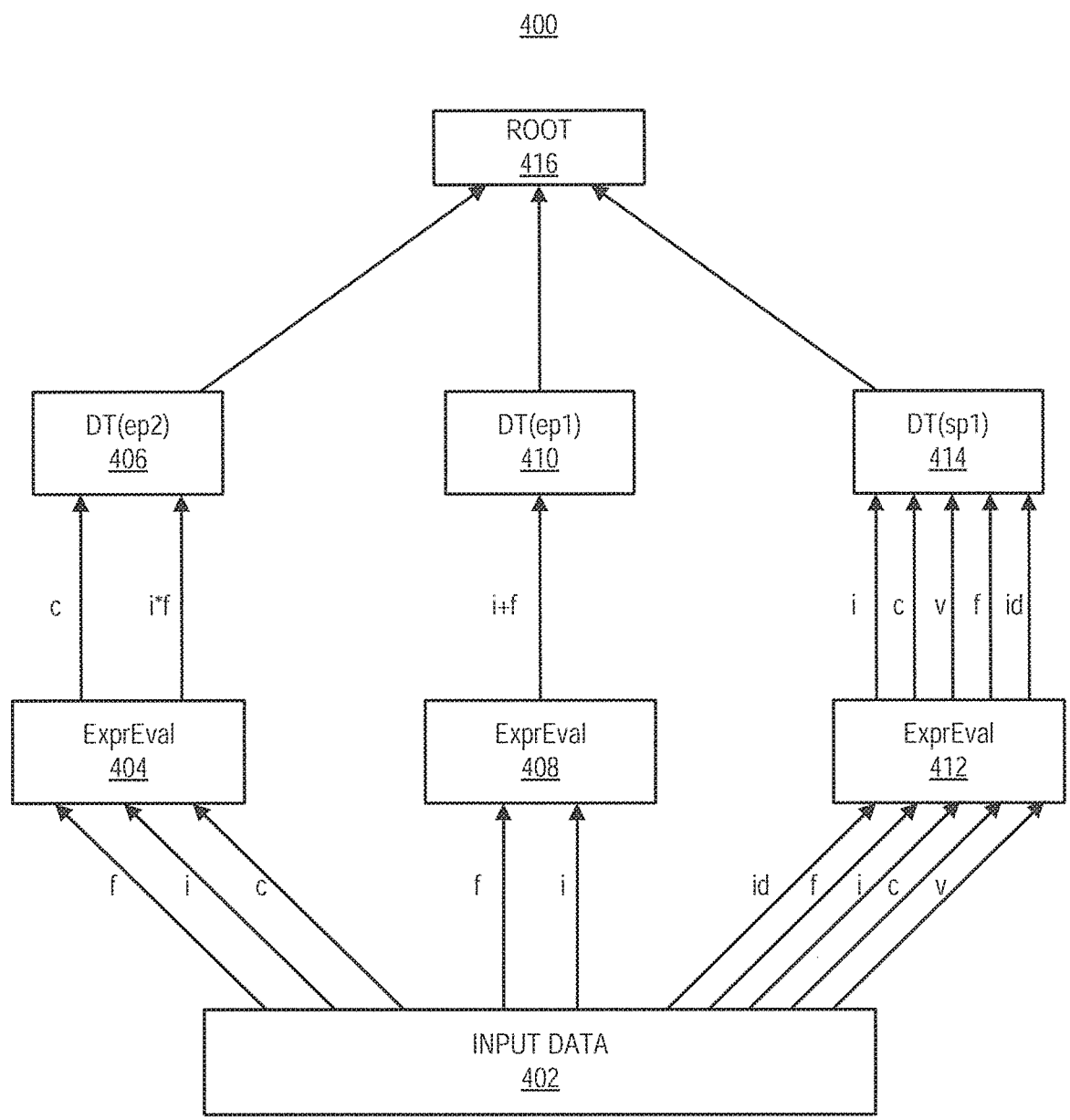

With reference first to FIG. 4, there is shown a diagram of a method 400 for inserting or copying data into an expression projection 126, according to an example. The processor 202 may implement the expression projection managing module 224 to perform the method 400. Generally speaking, the method 400 may be implemented to execute an appropriate expression on the data prior to inserting or copying the derived data into the expression projection 126. The method 400 is depicted with respect to Examples (2), (5), and (6) discussed above and thus references the columns and projection definitions discussed in those examples. It should be clearly understood that the references made to those elements is for purposes of illustration only and should thus not be construed as defining the scope of the method 400 in any respect.

At block 402, data that is to be inputted, e.g., copied or inserted, into an expression projection 126 may be accessed. For instance, the expression projection managing module 224 may access the data to be inputted in response to receipt of an Insert or Copy command.

In the example depicted in FIG. 4, the columns of the input data accessed at block 402 may be in the order of the columns in tab1, which, as described above, is [id, f, i, c, v]. In addition, the following values are to be inserted into tab1: (id:1, f:0.0, i:100, c:'a', v:'cat').

At block 404, an operator ExprEval ("expression evaluation") may be executed to execute an appropriate expression on the data that is to be inserted into a data target (DT) corresponding to the expression projection ep2. As described above in Example (6), the projection definition for ep2 includes the expression "c, i*f". In this regard, at block 404, the operator ExprEval may be executed on the input data from columns c, i, and f. Particularly, from Example (6), the value for the input data of column c may be directed to the DT for ep2 and the resulting value of the value of the input data of column i times the value of the input data of column f may also be directed to the DT for ep2, as indicated at block 406. In addition, at block 406, the resulting values of the input data from column c and columns i*f may be stored in ep2. Moreover, the data contained in ep2 may be sorted, encoded, segmented, etc., to enhance query performance on ep2, in manners as discussed above with respect to FIG. 3.

At block 408, an operator ExprEval may be executed to execute an appropriate expression on the data that is to be inserted into a data target (DT) corresponding to the expression projection ep1. As described above in Example (5), the projection definition for ep1 includes the expression "i+f". In this regard, at block 408, the operator ExprEval may be executed on the input data from columns i and f, as shown in FIG. 4. Particularly, from Example (5), the resulting value of the value of the input data of column i plus the value of the input data of column f may be directed to the DT for ep1, as indicated at block 410. In addition, at block 410, the resulting values of the input data from columns i+f may be stored in ep1. Moreover, the data contained in ep1 may be sorted, encoded, segmented, etc., to enhance query performance on ep1, in manners as discussed above with respect to FIG. 3.

At block 412, an operator ExprEval may be executed to execute an appropriate expression on the data that is to be inserted into a data target (DT) corresponding to the super projection sp1. As described above in Example (2), the projection definition for sp1 includes the expression "select i, c, v, f, id from tab1" and "order by id". In this regard, at block 412, the operator ExprEval may be executed on the input data from columns i, c, v, f, and id, as shown in FIG. 4. Particularly, from Example (2), only the order of the data contained in the columns need be modified prior to being directed to the DT for sp1, as indicated at block 414. In addition, at block 414, the resulting values of the input data from the columns may be stored in sp1. Moreover, the data contained in sp1 may be sorted, encoded, segmented, etc., to enhance query performance on sp1, in manners as discussed above with respect to FIG. 3.

At block 416, the root operator may return the number of rows executed by the operators below the root operator. For instance, the root operator may return results to a client, in which the results may either be the results of a query or the number of rows processed by an insert, delete, or update operation.

Figure 5A:
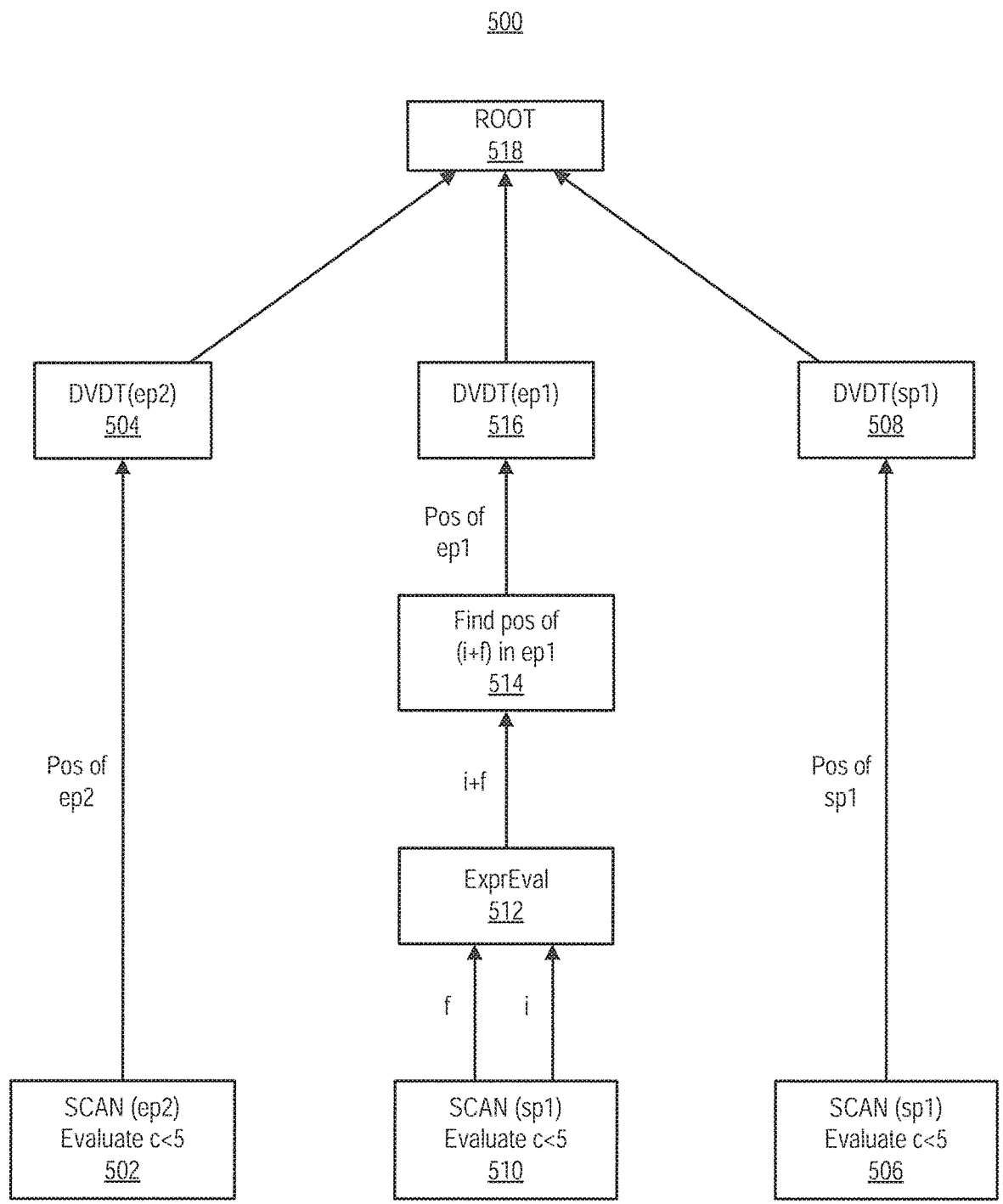
Figure 5B:
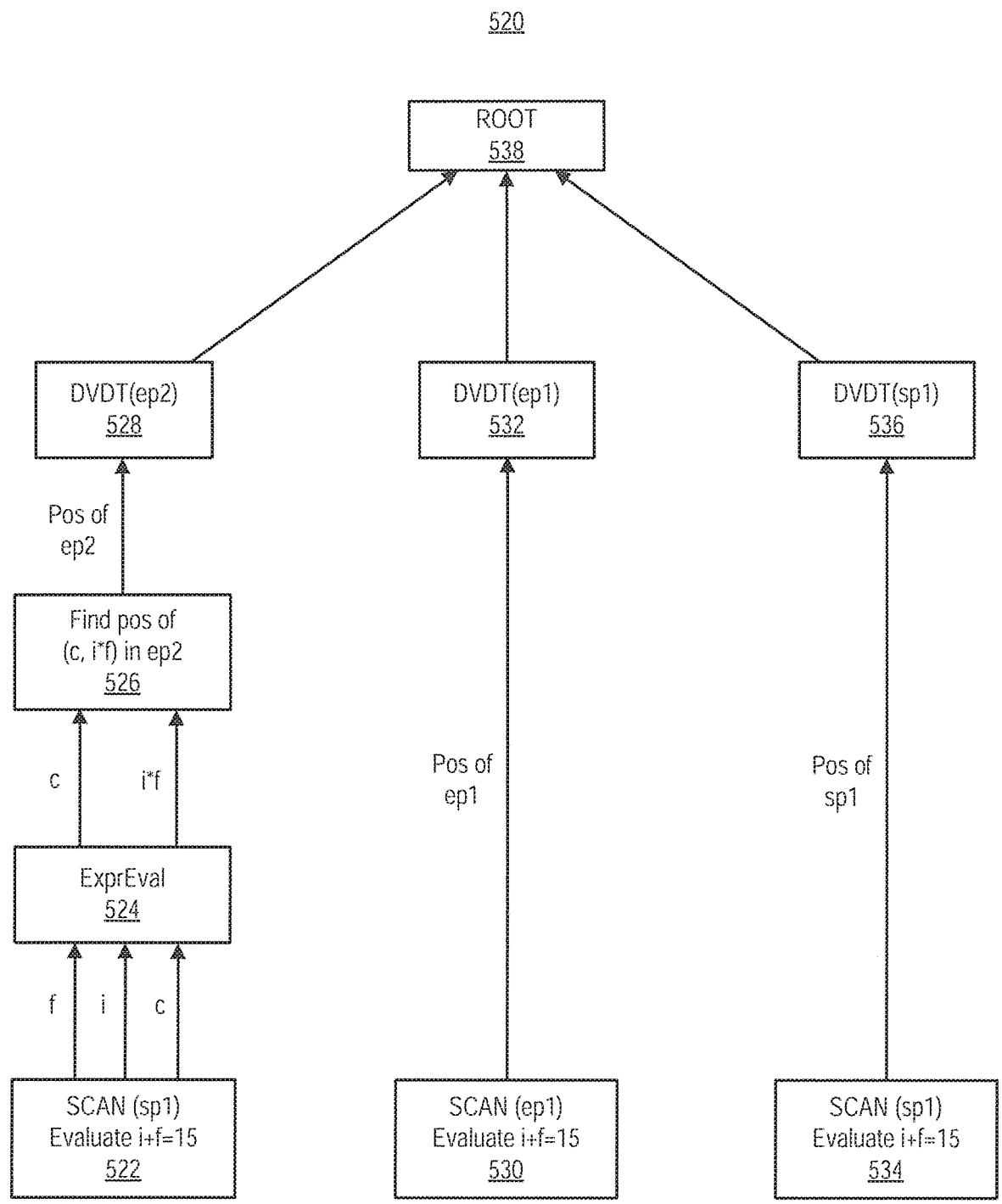
Figure 5C:
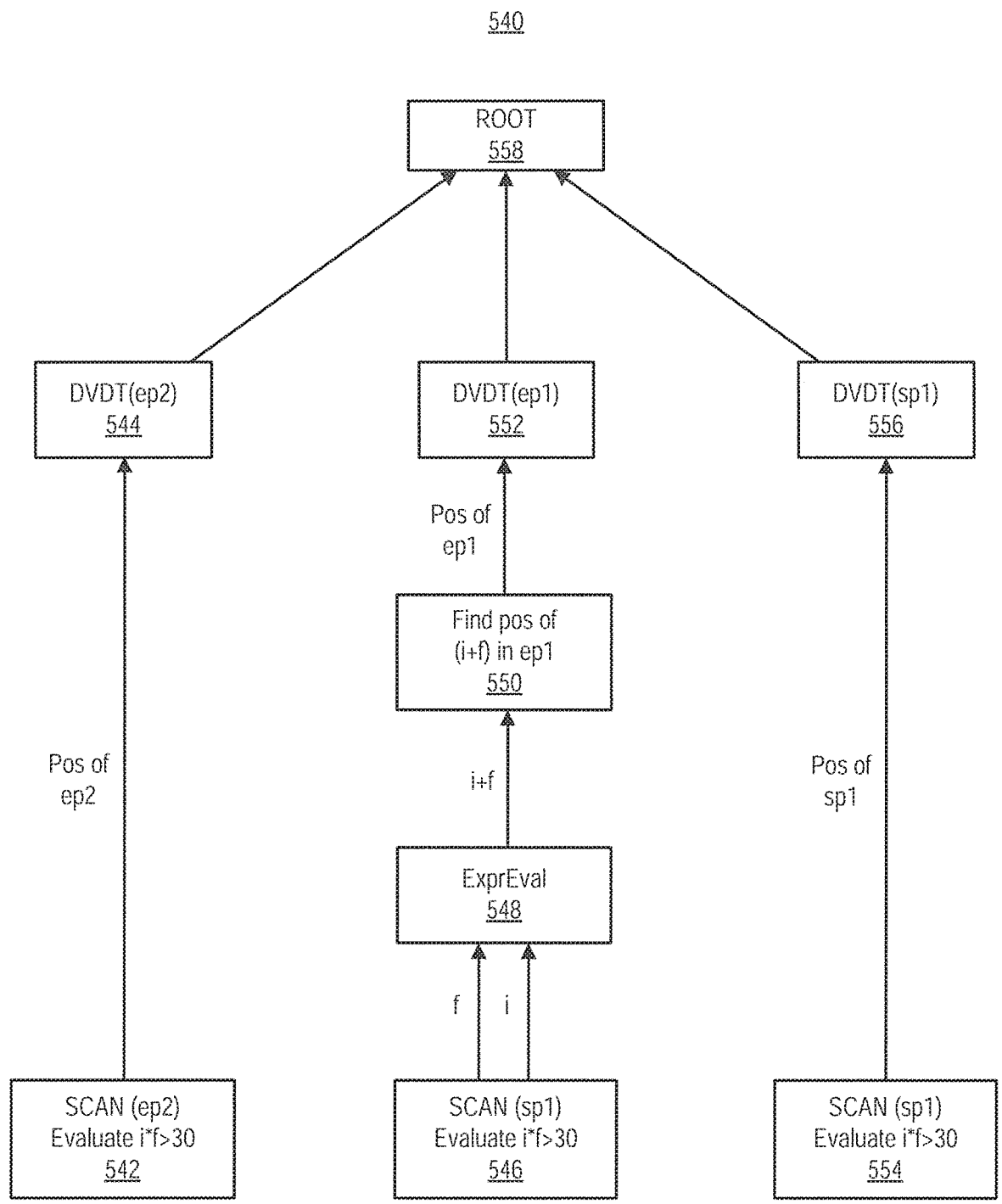

Turning now to FIGS. 5A-5C, there are respectively shown diagrams of methods 500, 520, and 540 for deleting data from a table that has an expression projection 126, according to three examples. The processor 202 may implement the expression projection managing module 224 to perform the methods 500, 520, and 540. According to an example, when data in a projection, including expression projections 126, is to be deleted, the positions of the deleted rows are inserted into a Delete Vector Data Target (DVDT). In this example, when data is selected, only the data whose positions are not in the DVDT may be returned.

Generally speaking, similar to loading data, a delete operation may be required for all of the projections of a given table. According to an example, there are two types of delete activities, which are named optimized delete and non-optimized delete. The optimized delete, which is a faster delete than the non-optimized delete, may only be performed for projections that include all of the columns used in a delete condition. This type of operation is called an optimized delete because the projection positions of the deleting rows may be retrieved directly from scanning that projection. In a non-optimized delete, the deleting projection does not include all of the columns used in a delete condition, and thus, the deleting positions may need to be retrieved by matching data scanned from a projection that includes all of the columns of the delete conditions and the columns of the deleting projection.

The optimized delete and the non-optimized delete may also be applied on expression projections 126, although expressions may be executed in some cases after a scan of the expression projections 126. The following three examples depicted in FIGS. 5A-5C illustrate optimized and non-optimized delete operations on specific expression projections of given delete conditions.

With reference first to FIG. 5A, the method 500 depicts a process that demonstrates the plan for the query: DELETE FROM tab1 where c<5. In addition, similarly to the method 400 depicted in FIG. 4, the method 500 is depicted with respect to Examples (2), (5), and (6) discussed above and thus references the columns and projection definitions discussed in those examples. It should be clearly understood that the references made to those elements is for purposes of illustration only and should thus not be construed as defining the scope of the method 500 in any respect.

At block 502, ep2 may be scanned and evaluated for column c<5. Because ep2 contains column c as noted in Example (5), an optimized delete may occur on ep2. As such, the projection positions of the deleting rows may be retrieved directly from scanning ep2 and the projection positions of the deleting rows may be directed to the DVDT for ep2, as indicated at block 504.

At block 506, sp1 may be scanned and evaluated for column c<5. Because sp1 includes column c as noted in Example (2), an optimized delete may occur on sp1. As such, the projection positions of the deleting rows may be retrieved directly from scanning sp1 and the projection positions of the deleting rows may be directed to the DVDT for sp1, as indicated at block 508.

At block 510, sp1 may be scanned and evaluated for column c<5. Sp1 may be scanned instead of ep1 at block 510 because as indicated in Example (5), ep1 does not include column c, and because sp1 is a super projection, sp1 contains all of the columns of tab1. As such, a non-optimized delete operation may be performed on ep1. In the non-optimized delete operation, sp1 may be scanned for columns in the delete condition, in this case column c, as well as all of the columns in ep1, in this case, columns f and i. In other words, the rows that meet the condition c<5 may be identified and the i and f values that correspond to those rows in c may also be identified. The output of the scan performed at block 510 may be those values of f and i that correspond to the values of c that meet the c<5 condition, which may be sent to ExprEval to compute i+f (from Example (5)), as indicated at block 512. The results of i+f may be matched with values of c<5 in sp1 to determine the deleting row positions in ep1, as indicated at block 514. That is, at block 514, a row in ep1 may be found that includes the value of i+f calculated at block 512. In addition, at block 514, the rows in ep1 having results of i+f that match the condition c<5 may be targeted for deletion. In addition, the projection positions of the deleting rows in ep1 may be directed to the DVDT for ep1, as indicated at block 516.

At block 518, the root operator may return the number of rows executed by the operators below the root operator. For instance, the root operator may return results to a client, in which the results may either be the results of a query or the number of rows processed by an insert, delete, or update operation.

With reference now to FIG. 5B, the method 520 depicts a process that demonstrates the plan for the query: DELETE FROM tab1 where i+f=15. In addition, similarly to the method 500 depicted in FIG. 5A, the method 520 is depicted with respect to Examples (2), (5), and (6) discussed above and thus references the columns and projection definitions discussed in those examples. It should be clearly understood that the references made to those elements is for purposes of illustration only and should thus not be construed as defining the scope of the method 520 in any respect.

At block 522, sp1 may be scanned and evaluated for i+f=15. Sp1 may be scanned instead of ep2 at block 522 because as indicated in Example (6), ep2 does not include the expression i+f. As such, a non-optimized delete operation may be performed on ep2. In the non-optimized delete operation, sp1 may be scanned for columns in the delete condition as well as all of the columns in ep2, in this case, columns f, i, and c. In other words, the rows that meet the condition i+f=15 may be identified and the i, f, and c values that correspond to those rows in i and f may also be identified. The output of the scan performed at block 522 may be those values of columns f, i, and c, that correspond to the values of i, f, and c values that meet the i+f=15 condition, which may be sent to ExprEval to compute c and i*f (from Example (6)), as indicated at block 524. The results of c and i*f may be matched with values of i+f=15 in sp1 to determine the deleting row positions in ep2, as indicated at block 526. That is, at block 526, a row in ep2 may be found that includes the values of c and i*f calculated at block 524. In addition, at block 526, the rows in ep2 having results of c, i*f that match the condition i+f=15 may be targeted for deletion. In addition, the projection positions of the deleting rows in ep2 may be directed to the DVDT for ep2, as indicated at block 528.

At block 530, ep1 may be scanned and evaluated for i+f=15. Because ep1 contains values for this expression as noted in Example (5), an optimized delete may occur on ep1. As such, the projection positions of the deleting rows may be retrieved directly from scanning ep1 and the projection positions of the deleting rows may be directed to the DVDT for ep1, as indicated at block 532.

At block 534, sp1 may be scanned and evaluated for i+f=15. Because sp1 includes columns i and f as noted in Example (2), an optimized delete may occur on sp1. As such, the projection positions of the deleting rows may be retrieved directly from scanning sp1 and the projection positions of the deleting rows may be directed to the DVDT for sp1, as indicated at block 536.

At block 538, the root operator may return the number of rows executed by the operators below the root operator. For instance, the root operator may return results to a client, in which the results may either be the results of a query or the number of rows processed by an insert, delete, or update operation.

With reference now to FIG. 5C, the method 540 depicts a process that demonstrates the plan for the query: DELETE FROM tab1 where i*f>30. In addition, similarly to the method 500 depicted in FIG. 5A, the method 540 is depicted with respect to Examples (2), (5), and (6) discussed above and thus references the columns and projection definitions discussed in those examples. It should be clearly understood that the references made to those elements is for purposes of illustration only and should thus not be construed as defining the scope of the method 540 in any respect.

At block 542, ep2 may be scanned and evaluated for i*f>30. Because ep2 contains values for this expression as noted in Example (6), an optimized delete may occur on ep2. As such, the projection positions of the deleting rows may be retrieved directly from scanning ep2 and the projection positions of the deleting rows may be directed to the DVDT for ep2, as indicated at block 544.

At block 546, sp1 may be scanned and evaluated for i*f>30. Sp1 may be scanned instead of ep1 at block 546 because as indicated in Example (5), ep1 does not include the expression i*f. As such, a non-optimized delete operation may be performed on ep1. In the non-optimized delete operation, sp1 may be scanned for columns in the delete condition as well as all of the columns in ep1, in this case, columns f and i. In other words, the rows that meet the condition i*f>30 may be identified and the i and f values that correspond to those rows in i and f may also be identified. The output of the scan performed at block 546 may be those values of columns f and i that correspond to the values of i and f values that meet the i*f>30 condition, which may be sent to ExprEval to compute i+f (from Example (5)), as indicated at block 548. The results of i+f may be matched with values of i+f in ep1 to determine the deleting row positions in ep1, as indicated at block 550. That is, at block 550, a row in ep1 may be found that includes the values of i and f calculated at block 548. That is, at block 550, the rows in ep1 having results of i+f that match the condition i*f>30 may be targeted for deletion. In addition, the projection positions of the deleting rows in ep1 may be directed to the DVDT for ep1, as indicated at block 552.

At block 554, sp1 may be scanned and evaluated for i*f>30. Because sp1 includes columns i and f as noted in Example (2), an optimized delete may occur on sp1. As such, the projection positions of the deleting rows may be retrieved directly from scanning sp1 and the projection positions of the deleting rows may be directed to the DVDT for sp1, as indicated at block 556.

At block 558, the root operator may return the number of rows executed by the operators below the root operator.

The expression projection managing module 224 may perform other functions, such as updates and merges through performance of operations similar to those described above with respect to the methods 400, 500, 520, and 540. For instance, an update operation may include both a delete and an insert operation, whereas a merge operation may include combinations of the update, delete, and insert operations.

Some or all of the operations set forth in the methods 300, 400, 500, 520, and 540 may be contained as utilities, programs, or subprograms, in any desired computer accessible medium. In addition, the methods 300, 400, 500, 520, and 540 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
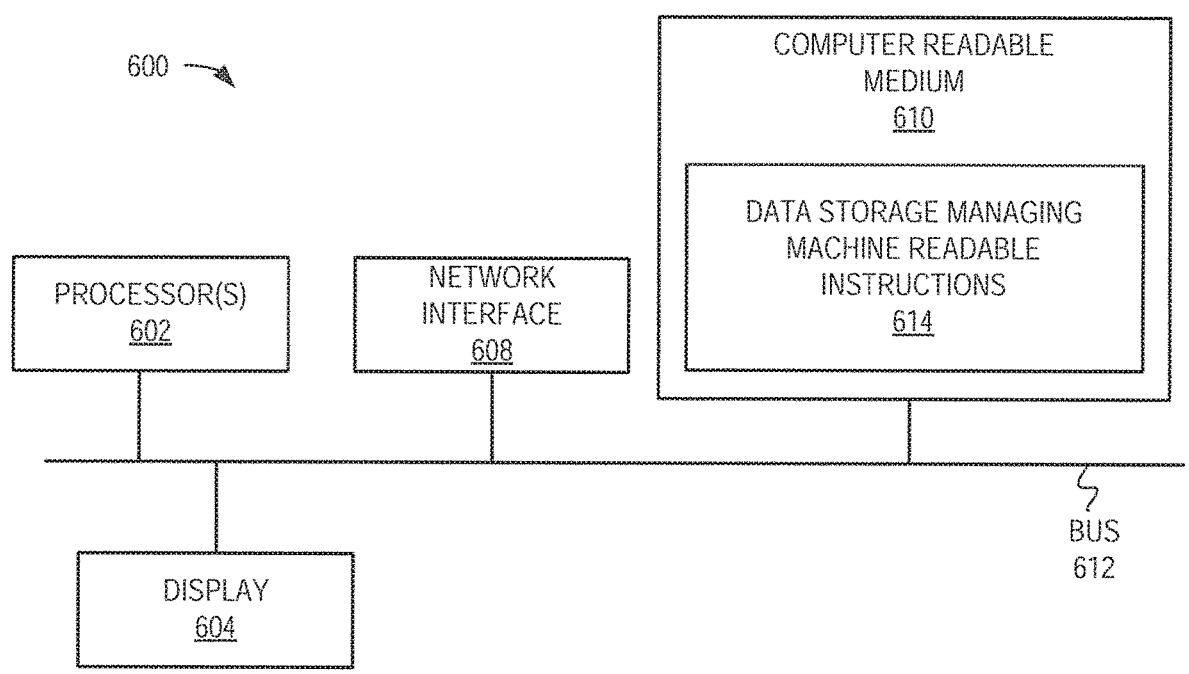
FIG. 6 illustrates a schematic representation of a computing device, which may be employed to perform various functions of the computing device depicted in FIG. 2, according to an example of the present disclosure.

Turning now to FIG. 6, there is shown a schematic representation of a computing device 600, which may be employed to perform various functions of the computing device 200 depicted in FIG. 2, according to an example. The computing device 600 may include a processor 602, a display 604, such as a monitor; a network interface 608, such as a Local Area Network LAN, a wireless 802.11x LAN, a 3G mobile WAN or a WiMax WAN; and a computer-readable medium 610. Each of these components may be operatively coupled to a bus 612. For example, the bus 612 may be an EISA, a PCI, a USB, a FireWire, a NuBus, or a PDS.

The computer readable medium 610 may be any suitable medium that participates in providing instructions to the processor 602 for execution. For example, the computer readable medium 610 may be non-volatile media, such as an optical or a magnetic disk; volatile media, such as memory. The computer-readable medium 610 may also store a data storage managing machine readable instructions 614, which may perform the methods 300, 400, 500, 520, and/or 540 and may include the modules 210-226 of the data management apparatus 110 depicted in FIGS. 1 and 2. In this regard, the table processing machine readable instructions 614 may include a projection definition accessing module 210, an expression executing module 212, a results data storing module 214, a results data sorting module 216, a results data encoding module 218, a results data segmenting module 220, an expression projection storing module 222, an expression projection managing module 224, and a query performing module 226.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing storage of data from an input table, said method comprising:

accessing a projection definition that identifies specific columns of the input table and includes an expression, including an operator, to be executed on data contained in the specific columns of the input table;

executing, by a processor, the expression in the projection definition, including executing the operator on the data contained in the specific columns of the input table to obtain results data;

storing, by the processor, the results data in an expression projection in a node;

receiving a delete command to delete a set of the results data in the expression projection, wherein the delete command includes a function to be executed on a column of the expression projection;

in response to a determination that the expression projection does not contain the column identified in the delete command, scanning a super projection for the column identified in the delete command, wherein the super projection is a projection that contains all columns of the input table;

executing, by the processor, the expression on data contained in a column in the super projection corresponding to the column identified in the delete command to obtain delete result data;

determining row positions in the expression projection having values that match the delete result data; and sending the determined row positions in the expression projection to a delete vector data target of the expression projection to cause the values in the expression projection that match the delete result data to be deleted.

2. The method according to claim 1, wherein the operator in the expression is an operator to add or multiply data contained in two columns of the input table.

3. The method according to claim 1, wherein the projection definition comprises a plurality of expressions to be executed on data contained in multiple sets of columns of the input table, said method further comprising:
executing the plurality of expressions on the data contained in the multiple sets of columns of the input table to obtain multiple sets of results data; and
storing the multiple sets of results data in multiple columns of the expression projection.

4. The method according to claim 1, wherein the projection definition further includes a sort order instruction and a segmenting instruction, said method further comprising:
sorting the results data in the expression projection according to the sort order instruction included in the projection definition; and
segmenting the results data in the expression projection according to the segmenting instruction included in the projection definition.

5. The method according to claim 1, further comprising:
maintaining a plurality of projections in addition to the expression projection in a manner that enables queries to be answered from at least one of the plurality of projections and the expression projection and the answers to the queries are consistent with answers resulting from a query of the input table.

6. The method according to claim 1, further comprising:
receiving a new set of data to be inserted into the expression projection;
executing the expression on the new set of data to obtain new results data;
storing the new results data in the expression projection;
sorting the results data and the new results data in the expression projection;
segmenting the results data and the new results data in the expression projection; and
encoding the results data and the new results data in the expression projection.

7. The method according to claim 1, wherein the expression projection includes a column that provides physical storage for the results data.

8. The method according to claim 1, further comprising:
in response to a determination that the expression projection contains the column identified in the delete command, sending row positions of the results data in the expression projection that match the set of the results data to be deleted in the delete command to the delete vector data target of the expression projection.

9. An apparatus for managing storage of data from an input table, said apparatus comprising:
a processor; and
a memory on which is stored machine readable instructions that are executable to cause the processor to:
access a projection definition that identifies specific columns of the input table and includes a function, including an operator, to be executed on data contained in the specific columns of the input table;
execute the function in the projection definition, including executing the operator on the data contained in the specific columns of the input table to obtain results data;
store the results data in a function projection in a node;
receive a delete command to delete a set of the results data contained in the function projection, wherein the delete command includes a function to be executed on a column of the function projection;
in response to a determination that the function projection does not contain the column identified in the delete command, scan a super projection for the column identified in the delete command, wherein the super projection is a projection that contains all columns of the input table;
execute the function on data contained in a column in the super projection corresponding to the column identified in the delete command to obtain delete result data;
determine row positions in the function projection having values that match the delete result data; and
send the determined row positions in the function projection to a delete vector data target of the function projection to cause the values in the function projection that match the delete result data to be deleted.

10. The apparatus according to claim 9, wherein the projection definition comprises a plurality of functions to be applied on data contained in multiple sets of columns of the input table, wherein the machine readable instructions are executable to cause the processor to:
apply the plurality of functions on the data contained in the multiple sets of columns of the input table to obtain multiple sets of results data; and
store the multiple sets of results data in multiple columns of the function projection.

11. The apparatus according to claim 9, wherein the projection definition further includes a sort order instruction and a segmenting instruction, wherein the machine readable instructions are executable to cause the processor to:
sort the results data in the function projection according to the sort order instruction included in the projection definition; and
segment the results data in the function projection according to the segmenting instruction included in the projection definition.

12. The apparatus according to claim 9, wherein the machine readable instructions are executable to cause the processor to:
receive a new set of data to be inserted into the function projection;
execute the function on the new set of data to obtain new results data;
store the new results data in the function projection;
sort the results data and the new results data in the function projection;
segment the results data and the new results data in the function projection; and
encode the results data and the new results data in the function projection.

13. The apparatus according to claim 9, wherein the function projection includes a column that provides physical storage for the results data.

14. A non-transitory computer readable storage medium on which is stored machine readable instructions that when executed by a processor cause the processor to:
access a projection definition that identifies specific columns of at least one input table and includes an expression, including an operator, to be executed on data contained in the specific columns of the at least one input table;

execute the expression in the projection definition, including executing the operator on the data contained in the specific columns of the at least one input table to obtain results data;

store the results data in an expression projection;

receive a delete command to delete a set of the results data contained in the expression projection, wherein the delete command includes a function to be executed on a column of the expression projection;

in response to a determination that the expression projection does not contain the column identified in the delete command, scan a super projection for the column identified in the delete command, wherein the super projection is a projection that contains all columns of the input table;

execute the expression on data contained in a column in the super projection corresponding to the column identified in the delete command to obtain delete result data;

determine row positions in the expression projection having values that match the delete result data; and send the determined row positions in the expression projection to a delete vector data target of the expression projection to cause the values in the expression projection that match the delete result data to be deleted.

15. The non-transitory computer readable storage medium according to claim 14, wherein the machine readable instructions are executable to cause the processor to:

receive a new set of data to be inserted into the expression projection;

execute the expression on the new set of data to obtain new results data;

store the new results data in the expression projection;

sort the results data and the new results data in the expression projection;

segment the results data and the new results data in the expression projection; and encode the results data and the new results data in the expression projection.

16. The non-transitory computer readable storage medium according to claim 14, wherein the expression projection includes a column that provides physical storage for the results data.

17. The non-transitory computer readable storage medium according to claim 14, wherein the operator in the expression is an operator to add or multiply data contained in two columns of the input table.

18. The apparatus according to claim 9, wherein the operator in the function is an operator to add or multiply data contained in two columns of the input table.

* * * * *